United States Patent [19]
Bottman

[11] Patent Number: 5,698,985
[45] Date of Patent: *Dec. 16, 1997

[54] CROSS-TALK MEASUREMENT INSTRUMENT WITH SOURCE INDICATION AS A FUNCTION OF DISTANCE

[75] Inventor: Jeffrey S. Bottman, Seattle, Wash.

[73] Assignee: Fluke Corporation, Everett, Wash.

[*] Notice: The term of this patent shall not extend beyond the expiration date of Pat. No. 5,532,603.

[21] Appl. No.: 796,903

[22] Filed: Feb. 5, 1997

Related U.S. Application Data

[63] Continuation of Ser. No. 599,739, Feb. 12, 1996, abandoned.
[51] Int. Cl.$^6$ .................................................. G01R 27/28
[52] U.S. Cl. ......................... 324/628; 324/616; 324/620; 324/539; 364/486
[58] Field of Search .................................... 324/628, 616, 324/533; 370/13

[56] References Cited

U.S. PATENT DOCUMENTS

| | | | |
|---|---|---|---|
| 5,185,735 | 2/1993 | Ernst | 370/13 |
| 5,532,603 | 7/1996 | Bottman | 324/628 |
| 5,570,029 | 10/1996 | Bottman et al. | 324/628 |

OTHER PUBLICATIONS

C.R. Harris, "Log. Frequency Plotter Speeds Recording of Crosstalk Measurement", Jul. 1973, pp. 112–113.
Sokolnikoff & Redhoffer, Mathematics of Physics and Modern Engineering, McGraw Hill, pp. 666–667, 1966.
C.R. Harris, "Log. Freqency–Plotter Speeds the Recording of Crosstalk Measurements", Off. Elec. Eng. J., vol. 66, pp. 2–3, 1973.
Sokolnikoff &Redheffer, "Mathematics of Physics and Modern Engineering", McGraw–Hill, pp. 666–667, 1966.
Press et al. "Numerical Recipes: The Art of Scientific Computing", Cambrige U. Press, pp. 121–126, 1986.

*Primary Examiner*—Ernest F. Karlsen
*Assistant Examiner*—Thomas Valone
*Attorney, Agent, or Firm*—Douglas J. Barker

[57] ABSTRACT

A pulse-based LAN cable test instrument that processes time-domain cross-talk measurement information in order to troubleshoot and quickly locate sources of cross-talk as a function of distance along the LAN cable system is provided. A pulse-response time record between a pair of transmission lines of the LAN cable system is first acquired. A series of steps to process the time-domain pulse response data in the time record are then performed to enhance the ability of the user to locate and troubleshoot the primary contributors to NEXT along any point of the LAN cable system. The pulse response data are first normalized as a function of distance from the LAN cable test instrument in order to compensate for losses along the LAN cable. Next, the pulse response data are integrated over the time record and the absolute value of the pulse response data is calculated to more clearly show the individual sources of cross-talk within the overall LAN cable pulse response. Finally, the pulse response data are scaled such that the areas of the LAN cable system causing a failing NEXT indication rise above a limit level on the graph to provide a fast visual determination of the sources of cross-talk for troubleshooting purposes.

12 Claims, 8 Drawing Sheets

CROSS-TALK MEASUREMENT INSTRUMENT WITH SOURCE INDICATION AS A FUNCTION OF DISTANCE

This application is a continuation of application Ser. No. 08/599,739, filed Feb. 12, 1996, now abandoned.

BACKGROUND OF THE INVENTION

This invention relates generally to electrical cable testing and troubleshooting, and in particular to a method and apparatus for processing time domain cross-talk information for troubleshooting local area network cables.

Local area networks (LAN's) now connect a vast number of personal computers, workstations, printers, and file servers in a modern office environment. A LAN system is typically implemented by physically connecting all of these devices with copper-conductor twisted-wire pair ("twisted-pair") LAN cables, the most common being an unshielded twisted-pair (type "UTP") LAN cable which is an eight-wire cable configured as four twisted-wire pairs. Each of the four twisted-wire pairs functions as a transmission line which conveys a data signal through the LAN cable. Each end of the LAN cable is terminated in an industry-standard connector, the most common being the type "modular (RJ-45)" or "RJ-45" connector. In a typical installation, LAN cables may be routed through walls, floors, and ceilings of the building. LAN cable systems require constant maintenance, upgrades, and troubleshooting because LAN cables and connectors are subject to breakage, offices and equipment must be moved within the building, and new equipment is added to the network.

The tasks of installing, replacing, or re-routing LAN cable systems typically fall on a professional cable installer or in-house network specialist. During the installation phase, each cable is routed through the building and a connector is attached to each end of the new cable. Each wire in the cable must be connected to its proper respective electrical connection on both ends of the cable in order for the LAN connection to function properly. Each LAN cable system may consist of multiple segments of cable coupled together through RJ-45 connectors. A LAN cable system that has been improperly installed or that has faulty cables or connectors can create data transmission errors. Therefore, the LAN cable system must be tested to verify proper operation and performance.

The relative speed of data communication and the associated bandwidth required over LAN cable systems has been steadily increasing. Data rates exceeding 100 megabits per second are increasingly common. Copper-wire LAN cable systems, which are closely related to traditional multiconductor telephone cable systems commonly found in commercial buildings, have been pushed to accommodate these higher data rates. Copper-wire LAN cable systems have the advantage over their optical fiber counterparts of being substantially less expensive and more versatile. However, the increasing demands for higher data rates have created increased burdens on the network specialist to maintain network reliability in the face of increasingly esoteric problems encountered at the higher data rates.

It is no longer sufficient to merely obtain proper electrical connections through a particular network link consisting of a LAN cable system. More subtle problems can surface that may cumulatively destroy LAN cable system performance at the higher data rates. Critical network parameters for the network specialist to be aware of include bandwidth through the LAN cable system (measured in terms of signal attenuation versus frequency) and near-end cross-talk (commonly referred to as "NEXT") between twisted-wire pairs within the LAN cable system, which is a frequency-domain measurement which varies as a function of frequency. The terms NEXT and cross-talk will be used interchangeably because the cross-talk measurements in this context are measured at the near-end of the LAN cable system.

LAN cables and connecting hardware ("connectors") are classified into different performance levels based on their relative ability to handle higher data rates. For example, LAN cables are commonly available in North America under "category 3" and "category 5" classifications, with category 5 LAN cable having the highest cross-talk performance. With the various grades of LAN cables now available, the network specialist must be careful to select the appropriate minimum level of performance of the LAN cable and connecting hardware in all the links of the LAN cable system that will support the network speed requirements. For example, the accidental inclusion of telephone-grade cable, which appears physically similar to higher performance LAN cables but typically with unacceptable bandwidth and cross-talk characteristics, into a portion of the LAN cable system may result in a non-functional or highly degraded network connection. The connecting hardware in the LAN cable system, which have been found to contribute to significant performance degradations, are also available in category 3 and category 5 classifications. The number of LAN cable connectors in the LAN cable system must generally be kept to a minimum in a given signal path lest the cumulative network performance degradation become too severe.

Cross-talk is most often a frequency domain measure of the level of isolation between any two data paths within the LAN cable system over a specified frequency range. The data paths are the twisted-wire pairs in the copper-wire LAN cable system. Maintaining a specified minimum level of cross-talk isolation in a LAN cable system is important in preventing interference between adjacent twisted-wire pairs in order to maintain network reliability. The ANSI/TIA/EIA PN-3287 Task Group on unshielded twisted pair link performance has promulgated a standard for cross-talk which specifies a minimum level of cross-talk isolation over a frequency range of 1 to 100 megahertz. In maintaining a network that complies with the TIA standard, the network specialist can be reasonably assured of full network performance with no significant error contributions from cross-talk between twisted-wire pairs if the cross-talk is below the minimum specified level over the desired frequency range.

Test instrument manufacturers are striving to build test instruments to assist the network specialist in fully testing and troubleshooting LAN cable systems generally, including the NEXT parameter. In order for a LAN cable system to pass the TIA specified limit, the cross-talk performance of the LAN cable network must meet or exceed the specified limit at all frequencies within the specified frequency range of 1 to 100 megahertz. Most LAN cable test instruments provide at least a pass or fail indication for NEXT performance measured at a set of frequencies as a frequency domain measurement.

However, providing a pass or fail message for the NEXT performance as a frequency domain measurement merely gives the user a general indication of problems within the LAN cable system and is not helpful for troubleshooting purposes. A graphical plot of the network pulse response versus distance, a time-domain measurement, is more useful for troubleshooting but may provide misleading information as to which portion of the LAN cable system is the primary contributor to the failing NEXT performance.

For troubleshooting purposes, the user needs to know which part or parts of the LAN cable system are the source of the problem which is causing the LAN cable network to fail its NEXT specification. A time domain measurement of cross-talk allows an indication of cross-talk versus distance along the LAN cable system because signals travel through the LAN cable system at a well known distance per unit of time. Therefore, it would be desirable to provide a LAN cable test instrument that processes time-domain cross-talk information to obtain more meaningful visual information as to the parts of the LAN cable system that are causing a failure of the overall NEXT specification.

SUMMARY OF THE INVENTION

In accordance with the present invention, a pulse-based LAN cable test instrument processes time-domain cross-talk measurement information in order to troubleshoot and locate sources of cross-talk in a LAN cable system.

A test instrument applies a test signal in the form of narrow pulses to a selected transmission line of a LAN cable while the cross-talk pulse response induced in another transmission line in the same LAN cable is measured and stored as a time record in digital memory. The test instrument is connected to the near-end of the LAN cable while a remote unit provides proper termination at the far-end to prevent unwanted reflections of the test signal. In an unshielded twisted-pair (type "UTP") LAN cable, each transmission line consists of a twisted-wire pair. The time record containing the pulse response of the LAN cable system is built over a series of measurements using a sequential sampling technique to improve the effective time resolution of the measurement.

A series of steps to process the time-domain pulse response data in the time record are performed to enhance the ability of the user to locate and troubleshoot the primary contributors to NEXT along any point of the LAN cable system. The pulse response data are first normalized as a function of distance from the LAN cable test instrument in order to compensate for losses along the LAN cable. This normalization is accomplished by multiplying the pulse response data by a compensating weight function which is empirically calculated for a typical LAN cable.

Next, the pulse response data are integrated over the time record and the absolute value of the pulse response data is calculated to more clearly show the individual sources of cross-talk within the overall LAN cable pulse response. The process of integration is employed to take advantage of the fact that the individual pulse responses from the connectors along the LAN cable system tend to be bipolar in nature. Integration captures the area under the curve of the bipolar pulse response, positive and negative, to arrive at a more visually well defined response corresponding to a single, unipolar pulse for each individual source of cross-talk. The effects of ringing and noise are greatly reduced by integration to further ease visual interpretation of the pulse response data.

Finally, the pulse response data are scaled such that the areas of the LAN cable system causing a falling NEXT indication rise above a predetermined limit level of the graph to provide a fast visual determination of the sources of cross-talk for troubleshooting purposes. The cross-talk sources that are likely causing a failure of the LAN cable system to meet the overall NEXT specification appear above the predetermined limit level that is correlated to the frequency-domain NEXT specification limit. Because NEXT may be tested to category 3 or category 5 levels or any other predetermined level of performance, the limit level must be changed accordingly. The pulse response data may be linear or logarithmically scaled along the amplitude axis. The processed pulse response data and limit level may now be visually displayed to the user on a graph of amplitude versus distance.

One object of the present invention is to provide a method of processing pulse response information to quickly locate sources of cross-talk.

Another object of the present invention is to provide a method of processing and visually displaying cross-talk pulse response information to quickly locate sources of cross-talk between a pair of transmission lines.

An additional object of the present invention is to provide a method of processing and visually displaying time-domain pulse response data of cross-talk between transmission lines in which the sources of cross-talk contributing to a failing frequency-domain NEXT performance appear above a predetermined limit level.

Another object of the present invention is to provide a test instrument capable of visually displaying pulse response data of cross-talk between transmission lines in order to quickly locate sources of cross-talk for troubleshooting purposes.

Other features, attainments, and advantages will become apparent to those skilled in the art upon a reading of the following description when taken in conjunction with the accompanying drawings.

DETAILED DESCRIPTION OF THE INVENTION

Figure 1:
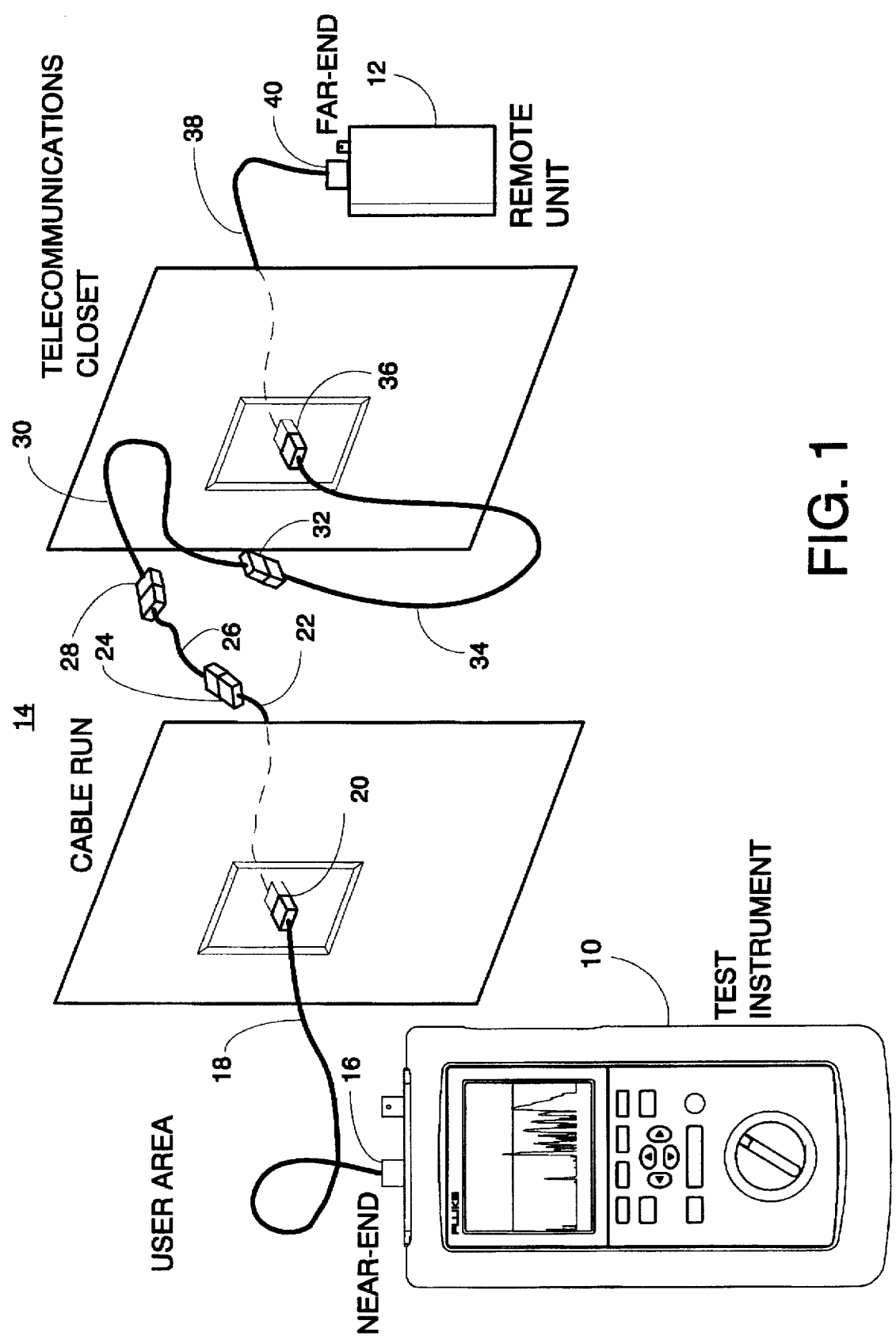
FIG. 1 is an illustration of a LAN cable test instrument and a remote unit coupled to the near-end and the far-end respectively of a LAN cable system.

FIG. 1 is an illustration (not to scale) of a test instrument 10 and a remote unit 12 coupled to a near-end and a far-end respectively of a LAN cable system 14. The terms near-end and far-end are adopted by convention to mean the respective ends of LAN cable system, with the near-end coupled to the test instrument 10 making the cross-talk measurements. The total length of the LAN cable system 14 is typically limited to 100 meters and may have multiple connectors and cables within its span, as required to gain extensions or repair breaks.

The test instrument 10 is coupled via a near-end connector 16 and a cable 18 to a connector 20. The test instrument 10 is typically applied in a user area in which the desired peripherals such as computer workstations and printers are located in a typical office environment. The connector 20 is coupled to a cable 22 which is coupled to a connector 24 which is further coupled to a cable 26. The cable 26 is coupled to a connector 28 which is further coupled to a cable 30, a connector 32, a cable 34, and a connector 36. The cables 22, 26, 30 and 34 are located within a cable run within the building or facility. The cable run is the path the LAN cable system must take through the physical facility and may include travel under floors, through walls, above ceilings, and other spaces within the facility. A cable 38 is coupled to the connector 36 and is further coupled to a connector 40 at a telecommunications closet at the far-end of the LAN cable system 14. The telecommunications closet typically serves to receive multiple LAN cable systems 14 from various points within the facility to form an entire local area network.

To facilitate the testing of the connection through the LAN cable system 14, the remote unit 12 is coupled to the connector 40 to provide a proper termination of the test signals generated by the test instrument 10. The LAN cable system 14, comprising the connectors 16, 20, 24, 28, 32, 36 and 40 and the cables 18, 22, 26, 30, 34, and 38 as illustrated in FIG. 1, may have any number of different variations and combinations of cables and connectors and is shown in this particular configuration only for purposes of example. It will be noted that the LAN cable system 14 is not a TIA/EIA 568-A compliant test configuration but instead represents a typical configuration that is likely to be encountered by the professional cable installer or in-house network specialist in actual applications.

Figure 2:
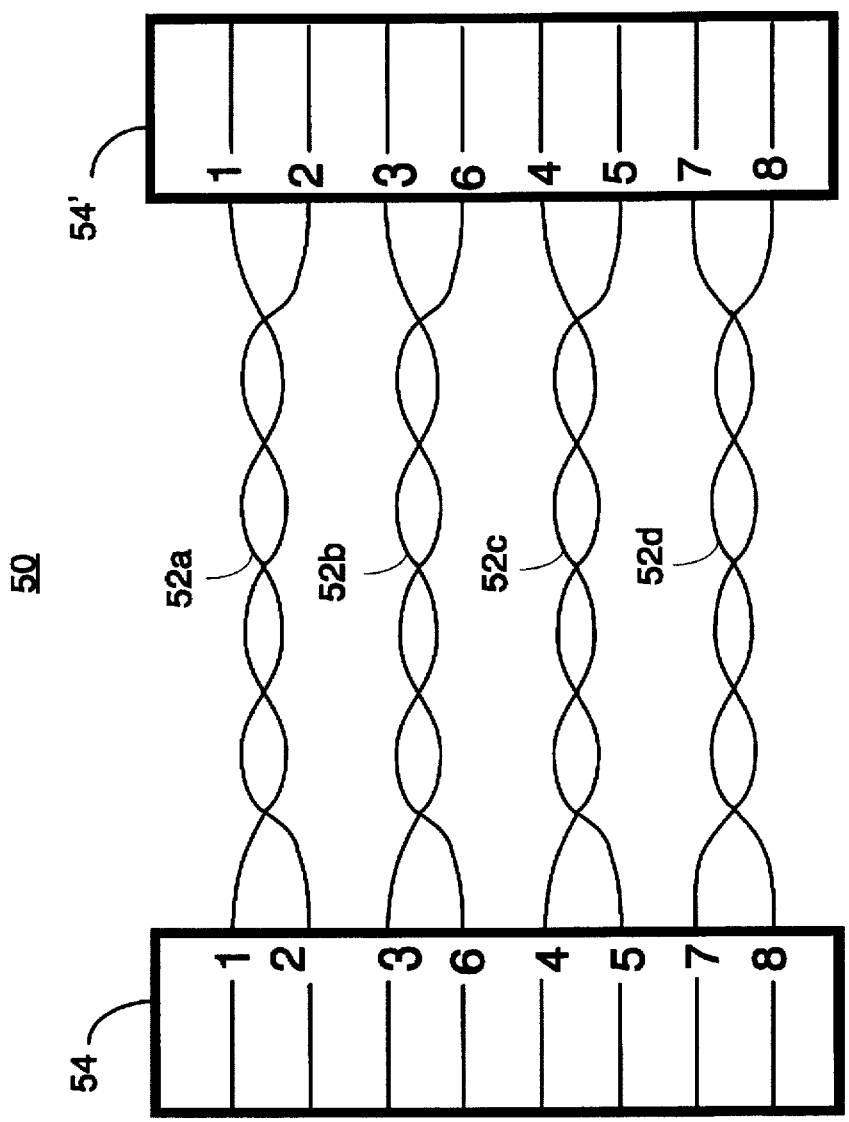
FIG. 2 is a schematic diagram of a typical LAN cable which forms a segment of the LAN cable system of FIG. 1.

FIG. 2 is a schematic diagram of a LAN cable 50 that is an example of a typical UTP, eight-conductor, copper-wire LAN cable that may be tested by the present invention. The LAN cable system 14 is made up of segments formed by LAN cables 50 coupled in series. Wire pairs 52a–d are twisted together within the LAN cable 50 in such a way as to minimize the cross-talk between any two wire-pairs. On either end of the LAN cable 50 are connectors 54 and 54' which mate with other LAN cable connectors to form the desired electrical connections according to industry convention in the LAN cable system 14. Wire pairs 52a–d are coupled to a predetermined set of connections within the connectors 54 and 54' to form pairs 1-2, 3-6, 4-5, and 7-8 respectively which function as the four separate, independent transmission lines.

The connectors 54 and 54' are typically modular (RJ-45) connectors adopted from the telephone industry and comprise both male and female type connectors. Multiple LAN cables 50 are coupled together by mating the connectors 54 and 54' to form completed connections. The LAN cable 50 and the connectors 54 and 54' thus comprise the basic building block of the LAN cable system 14 with may be constructed from any number of such building blocks.

Maintaining a desired level of cross-talk performance in the LAN cable system 14 requires maintaining a balanced capacitance between any two twisted pairs in the LAN cable 50 at any point along its length so that signal voltages in one twisted pair do not induce voltages in another twisted pair. Maintaining this capacitance balance has become increasingly critical as higher data rates are sent through the LAN cable 50. The LAN cable 50 is available commercially under assorted data grades, categories 3 and 5 being well known in North America, which define the level of performance over a desired frequency range. This level of performance is a direct function of the physical consistency of the twisting of the wire pairs 52a–d along any given span of the LAN cable. The mated connectors 54 and 54' are also available under assorted data grades, again categories 3 and 5 in North America, to define their relative level of performance. Because the LAN cable system 14 has many potential sources of cross-talk from both LAN cables and connectors, providing a method of visually indicating the source of cross-talk as a function of distance from the test instrument 10 is important in determining the cause or causes of the overall failure of the cross-talk performance of the LAN cable system 14.

Figure 3:
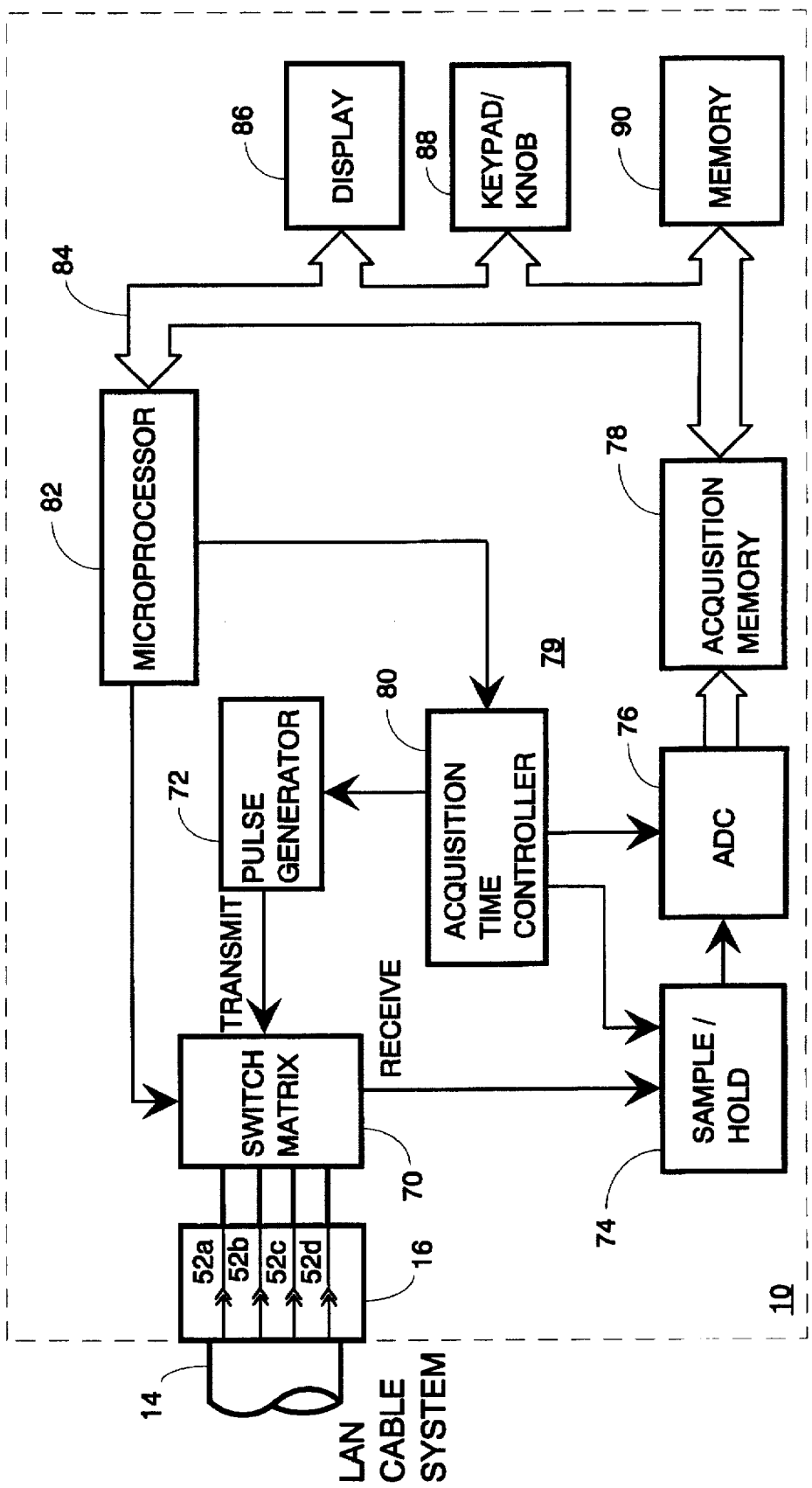
FIG. 3 is a simplified block diagram of the LAN cable test instrument of FIG. 1 according to the present invention.

FIG. 3 is a simplified block diagram of the test instrument 10 (shown in FIG. 1) according to the present invention. The connector 16 is coupled to the wire pairs 52a–d (shown in FIG. 2) contained within the LAN cable system 14 illustrated here as four transmission lines. The wire pairs 52a–d are further coupled to a switch matrix 70 which selectively couples one of the wire pairs 52a–d to an output of a pulse generator 72 and further selectively couples another of the wire pairs 52a–d to an input of a sample-and-hold circuit (S/H) 74 which captures a voltage level present at the input upon receipt of a signal at a control input. Each wire pair 52a–d is essentially a balanced transmission line. The output of the pulse generator 72 and the input of the S/H 74 are unbalanced or referenced to ground in the preferred embodiment of the present invention, requiring the addition of transformers (not shown) for each wire pair 52a–d to convert from a balanced to an unbalanced transmission line. The wire pairs 52a–d are drawn as single lines because each pair constitutes a single transmission line.

The pulse generator 72 sends a pulse to a selected one of the four wire pairs 52a–d on receipt of a signal at a control input. The S/H 74 receives the pulse response from another one of the four wire pairs 52a–d. An output of the S/H 74 is coupled to an input of an analog-to-digital converter (ADC) 76 which digitizes the voltage level received from the S/H 74 on receipt of a signal at a control input. An output of the ADC 76 is coupled to an acquisition memory 78 which stores the digital measurements as a digital time record on receipt of a signal at a control input. An acquisition time controller 80 is coupled to the control input of the S/H 74, ADC 76, and pulse generator 72 to facilitate a repetitive digital sampling process that achieves a high equivalent sampling rate with a minimum of timing errors by the coordinated generation of the control signals at the proper times to the respective control inputs of the S/H 74, ADC 76, and pulse generator 72. The S/H 74, ADC 76, acquisition time controller 80 and acquisition memory 78 together comprise a digitizer 79 which digitizes the received pulse responses using repetitive sequential sampling to obtain a higher equivalent sampling rate than is readily obtainable with real-time sampling techniques. In the preferred embodiment of the present invention, the equivalent sampling rate of the digitizer 79 is 500 megasamples per second, or conversely, a time resolution of 2 nanoseconds per point. The measurement process is then one of assembling a 4,096 point time record, sample by sample, with 2 nanosecond resolution in the acquisition memory 78 at an actual sample rate of approximately 4 megahertz. The time record thus acquired contains the NEXT pulse response of the LAN cable system 14 between the selected one and another of the wire pairs 52a–d.

A microprocessor 82 controls the overall measurement process and is coupled to a control input of the switch matrix 70 to select the respective wire pairs 52a–d to measure and to a control input of the acquisition time controller 80 to control the acquisition process. The microprocessor 82 is further coupled to a display 86, a keypad/knob 88, and an instrument memory 90 via an instrument bus 84. Instrumentation bus 84 contains parallel data and address lines to facilitate communications between the devices in a manner well known in the electronics field. The time record collected in the acquisition memory 78 is transferred to the instrument memory 90 for storage. The keypad/knob 88 and display 86 comprise the user interface of the instrument 10. The memory 90 is used to store digital time records and instrument calibration data and may be comprised of a single integrated circuit or multiple integrated circuits using technologies well known in the electronics field. The NEXT pulse response now contained in the memory 90 is further processed according the method of the present invention as explained in detail below.

Figure 4:
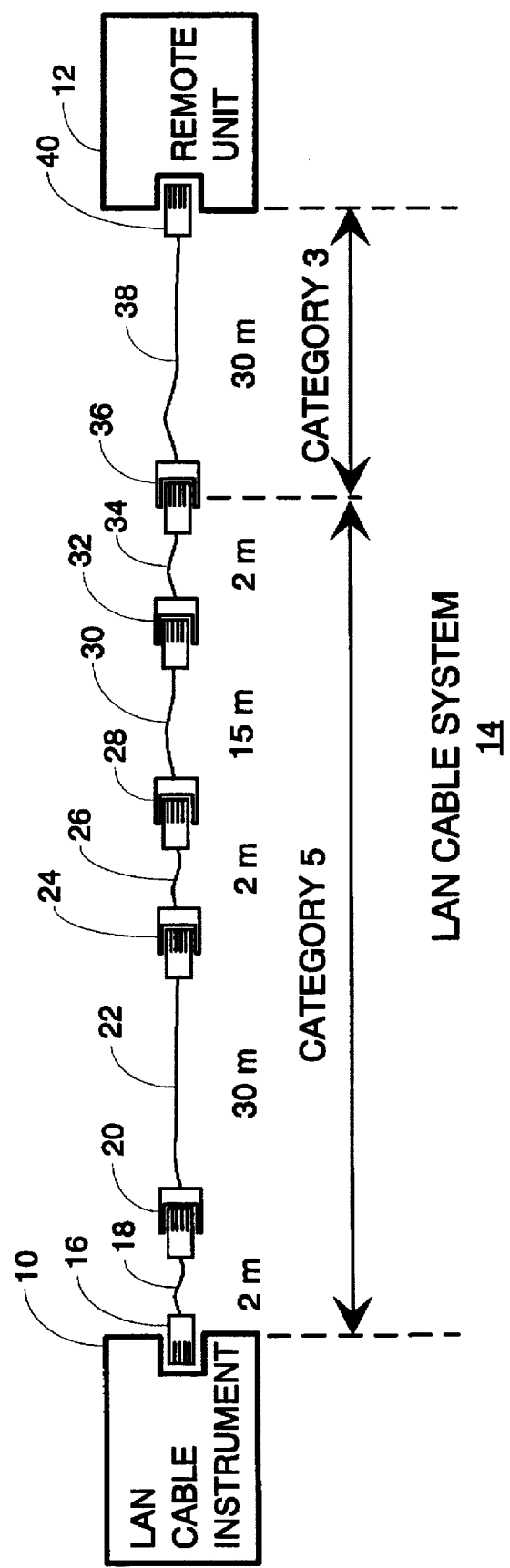
FIG. 4 is a schematic diagram illustrating a LAN cable test instrument and remote unit testing the LAN cable system of FIG. 1.

FIG. 4 is a schematic diagram (not to scale) of the LAN cable system 14 being tested by the test instrument 10 in conjunction with the remote unit 12 in which a NEXT pulse response is acquired. For purposes of example, the LAN cable system 14 as shown is comprised of the cables 18, 22, 26, 30, 34, and 38 with lengths of 2, 30, 2, 15, 2, and 30 meters respectively, for a total length of approximately 81 meters. The cables 18, 22, 26, 30, and 34, along with the connectors 16, 20, 24, 28, and 32 are constructed to provide category 5 NEXT performance. The final segment, however, comprising the cable 38 and the connectors 36 and 40 are constructed according to category 3 NEXT performance. Such a scenario for the LAN cable system 14 is one typically encountered in actual service, maintenance, or installation applications in which some cables and connectors, although identical in physical appearance to other cables and connectors, have lower NEXT performance levels and become accidentally intermingled in the LAN cable system 14. As shown, the LAN cable system 14 does not pass the NEXT performance specification according to the category 5 performance level because of the final category 3 segment.

The test instrument 10 must provide visual information to the user to aid in the troubleshooting of the LAN cable system 14 to quickly locate and repair the source of the failing NEXT performance. FIG. 5 through FIG. 9 together illustrate the method of processing the cross-talk response of the LAN cable system 14 shown in FIG. 4 to provide this visual information according to the present invention.

Figure 5:
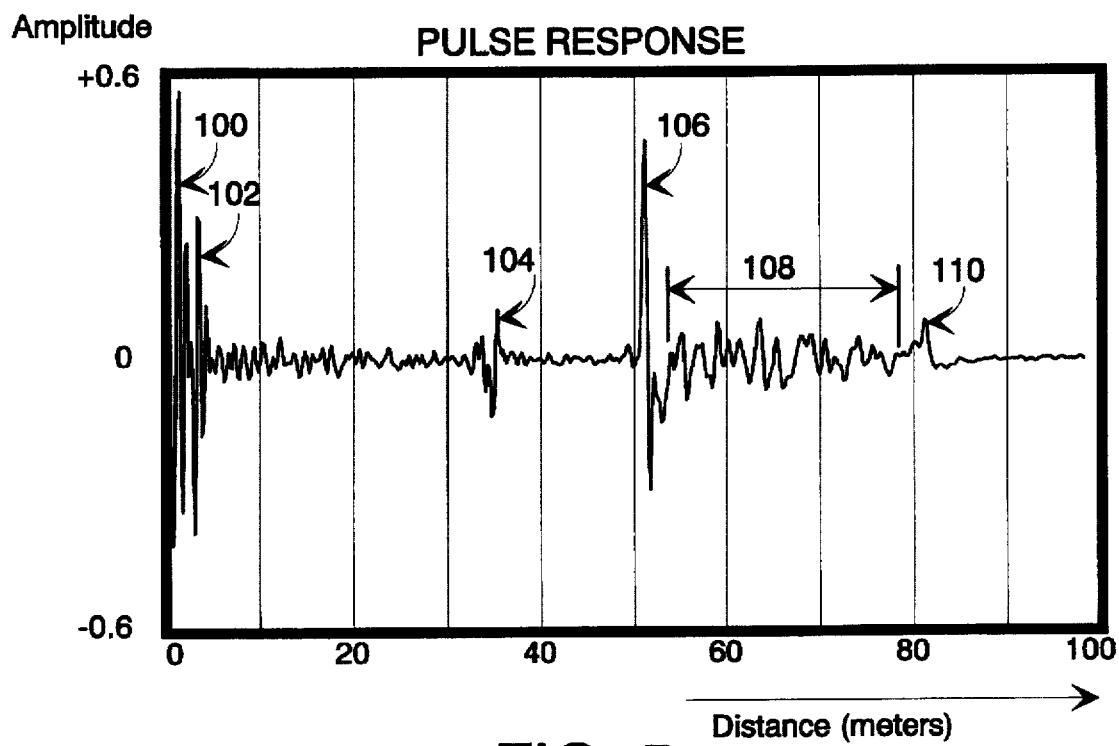
FIG. 5 is a graph illustrating the pulse response of the LAN cable system of FIG. 4 stored as a time record in the LAN cable test instrument.

FIG. 5 is a graph of the NEXT pulse response of the LAN cable system 14 between the selected one and another of the wire pairs 52a–d which is stored in the memory 90 (shown in FIG. 3) of the test instrument 10. The pulse response is stored as an array of the form $x_n$ where i is the index from 1 to n and n is the total length of the array. The horizontal axis, corresponding to the index, represents the distance along the LAN cable system 14 from the test instrument 10. The vertical axis is in terms of relative amplitude and represents the voltage level received over time back from the LAN cable system 14.

Various features of the pulse response may be readily correlated to the cables and connectors of the LAN cable system 14 as illustrated in FIG. 4. Peaks 100 and 102 correspond to cross-talk induced by the connectors 16 and 20 at the near-end of the LAN cable system 14. A peak 104 corresponds to cross-talk induced by the connectors 24 and 28. A peak 106 corresponds to cross-talk induced by the connector 36. A section 108 corresponds to cross-talk induced by the cable 38 having only category 3 performance over the distance of 51 meters to 81 meters from the near-end. A peak 110 corresponds to cross-talk induced by the connector 40 at a distance of 81 meters from the near-end which is the far-end of the LAN cable system 14.

Each of the peaks 100, 102, 104, 106, and 110 are bipolar in nature, containing both positive and negative voltages which correspond to the reactance occurring within the each connector. Because of attenuation over the length of the LAN cable system 14, pulse responses become more attenuated farther from the test instrument 10. Although the pulse response of FIG. 5 may provide the test instrument user with basic information as to the sources of cross-talk in the LAN cable system 14, additional knowledge would likely be needed to correctly interpret the primary contributors to a failing NEXT performance. For this reason, the cross-talk pulse response, without further processing, is not desirable for rapidly and accurately troubleshooting a LAN cable system 14.

Figure 6:
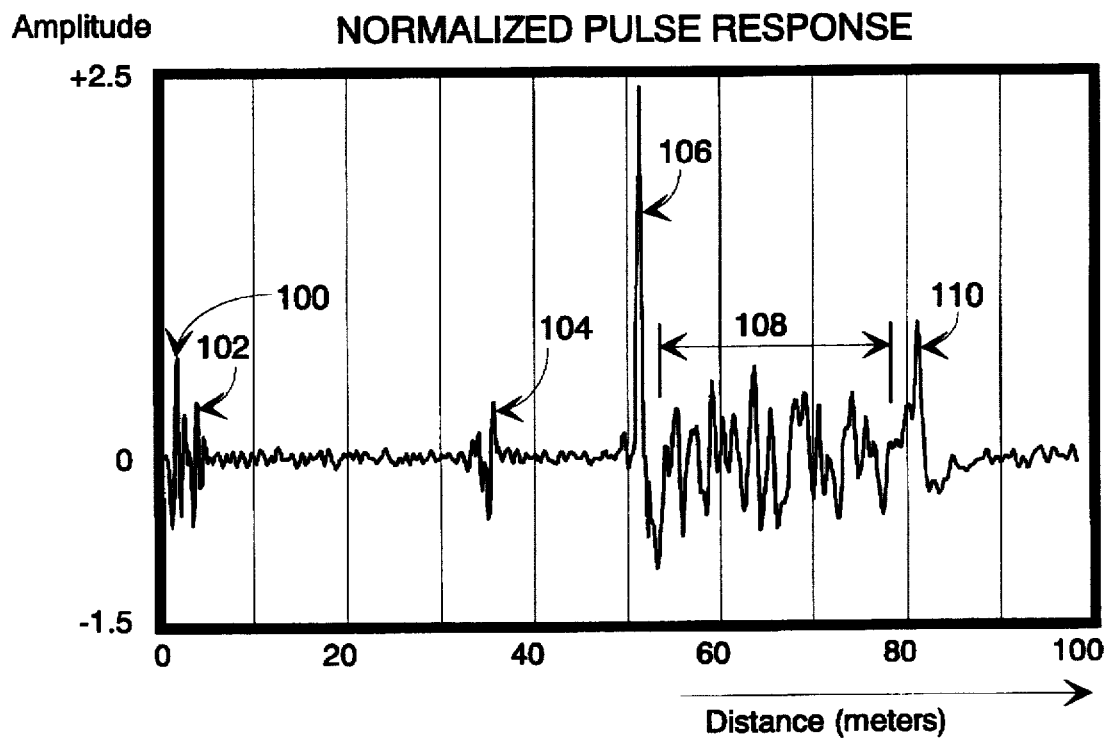
FIG. 6 is a graph illustrating the pulse response of FIG. 5 now normalized for losses along the distance of the LAN cable system.
Figure 7:
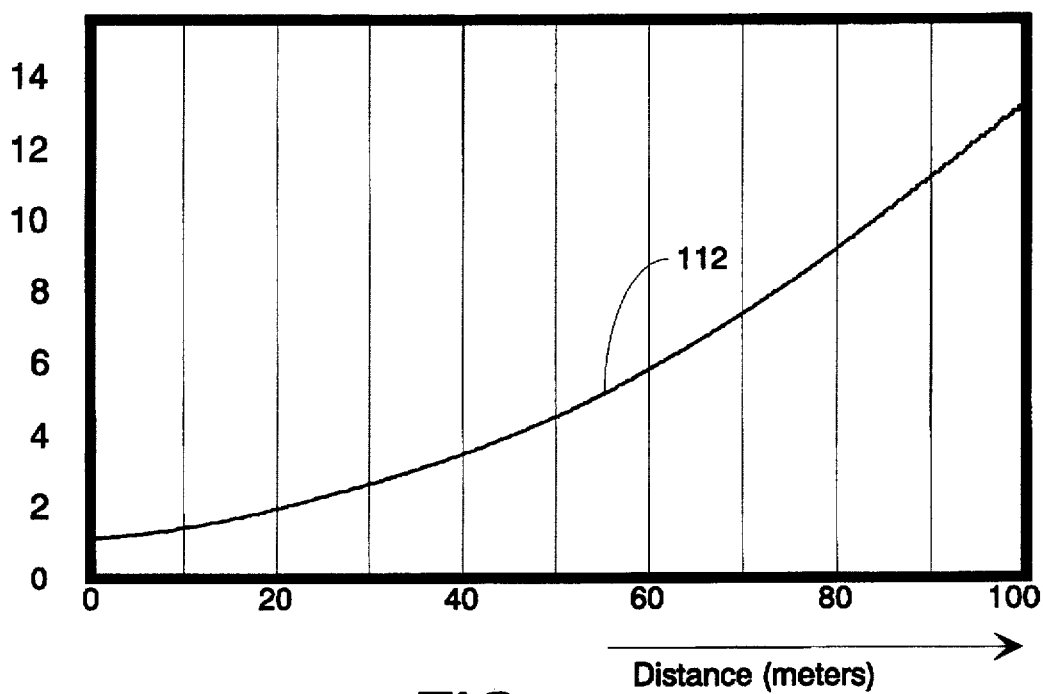
FIG. 7 is a graph illustrating a compensating weight function used to normalize the pulse response.

FIG. 6 shows the pulse response of FIG. 5 multiplied by a compensating weight function 112 shown in FIG. 7 to remove the effects of attenuation over the length of the LAN cable system 14 and thereby obtain a normalized pulse response. The compensating weight function is stored in the form of an array $c_n$ in the preferred embodiment. The process of multiplying the pulse response by the compensating weight function is given by equation (1) below:

$$w_n = v_n \cdot c_n \qquad (1)$$

where $c_n$ is the compensating weight function, $v_n$ is the pulse response, and $w_n$ is the normalized pulse response The compensating weight function 112 is unity or 1.0 at a distance of 0 meters, which is the near-end of the LAN cable system 14. As the distance from the near-end increases, the compensating weight function 112 proportionately increases to compensate for losses in the LAN cable system 14. The shape of the compensating weight function may be optimized for different types of cables. In the preferred embodiment, the compensating weight function 114 was arrived at empirically according to a best fit line calculated according to a fifth order polynomial equation.

In FIG. 6, the peaks 106 and 110 of the normalized pulse response are now substantially higher than the peaks 100 and 102. The cross-talk induced by the cable 38 along the section 108 is also substantially higher than the corresponding cross-talk in the FIG. 5. The connectors 36 and 40 corresponding to the peaks 100 and 102 are category 3 connectors while the other connectors in the LAN cable system are category 5 connectors. The normalized pulse response thus provides a more accurate visual indication of the primary contributors to the NEXT performance along the entire length of the LAN cable system 14.

Figure 8:
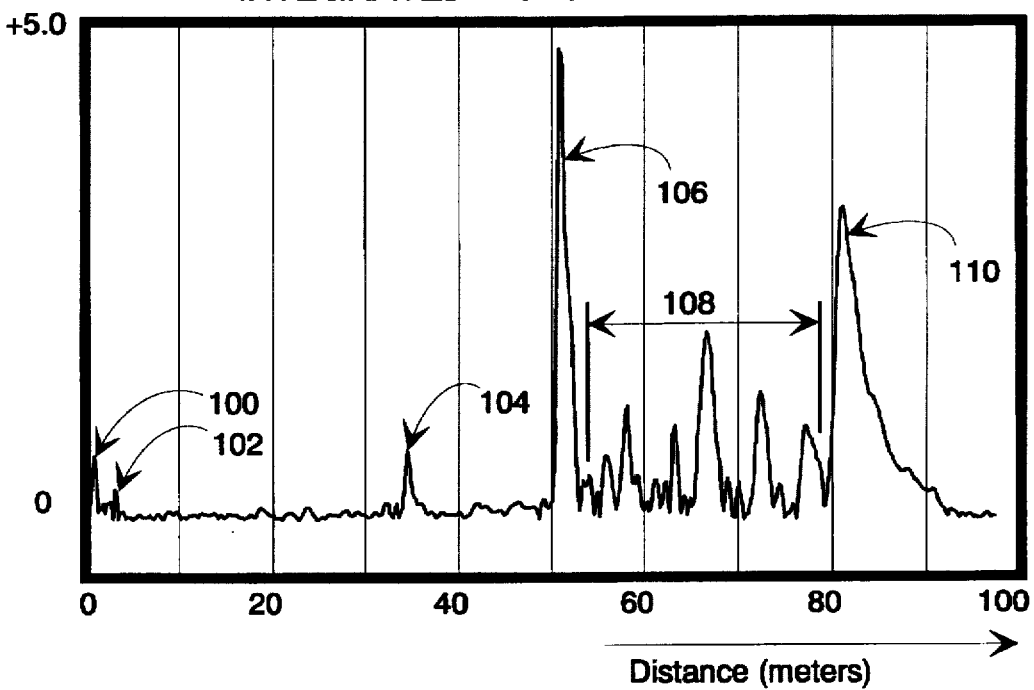
FIG. 8 is a graph illustrating the pulse response of FIG. 6 now integrated and in terms of absolute values.

In FIG. 8, there is shown the pulse response of FIG. 6 that has now been integrated and the absolute value of the each data point in the pulse response taken. Integration is performed to make more clear the locations along the LAN cable system 14 that have cross-talk. As noted above, connectors tend to have a cross-talk response that is bipolar in nature, with a negative going pulse following by a positive pulse, or vice-versa, in a manner well known for the pulse response of reactive components. By performing a process of integration, the total area under the positive and negative peaks is added together to obtain an integrated pulse, with the effects of ringing and random noise reduced. The integrated pulse may be positive or negative depending on the initial polarity of the bipolar pulse. The integration process is performed on the pulse response data stored in the memory 90 as an array indexed by number in accordance with equation (2) below. An absolute value of the integrated pulse response is then taken to capture only the magnitude of the integrated pulse response in accordance with equation (3) below:

$$x_n = \sum_{i=1}^{n} w_n \quad (2)$$

$$y_n = |x_n| \quad (3)$$

$w_n$ is the normalized pulse response $x_n$ is the integrated pulse response, and $y_n$ is the absolute value of the integrated pulse response. The resulting integrated pulse response for the pulse response data $y_1$ to $y_n$ is shown graphically in FIG. 8 and is stored in the memory 90 as an array. The peaks 100 and 102, which were surrounded by a substantial amount of ringing, are greatly reduced in the FIG. 8. Integration smoothes out the ringing, leaving the cross-talk peaks which are easier to interpret. Noise in the measurement also tends to make interpretation more difficult. Such measurement noise, if truly random, may be reduced by the integration process thereby increasing the ratio of cross-talk peaks to measurement noise. Taking the magnitude of the integrated pulse response allows only the magnitude information to be displayed because the polarity being irrelevant for fault location purposes.

Comparing FIG. 6 and FIG. 8, it can be seen that the peaks 104, 106, and 110 along with the cross-talk in the section 108 of the FIG. 8 are enhanced with respect to surrounding noise and ringing. Furthermore, the peaks of the integrated pulse response are now more closely aligned with the physical location of the respective connectors 28, 36, and 40. Less interpolation between the bipolar peaks of the cross-talk response is thus required for the integrated pulse response.

Figure 9:
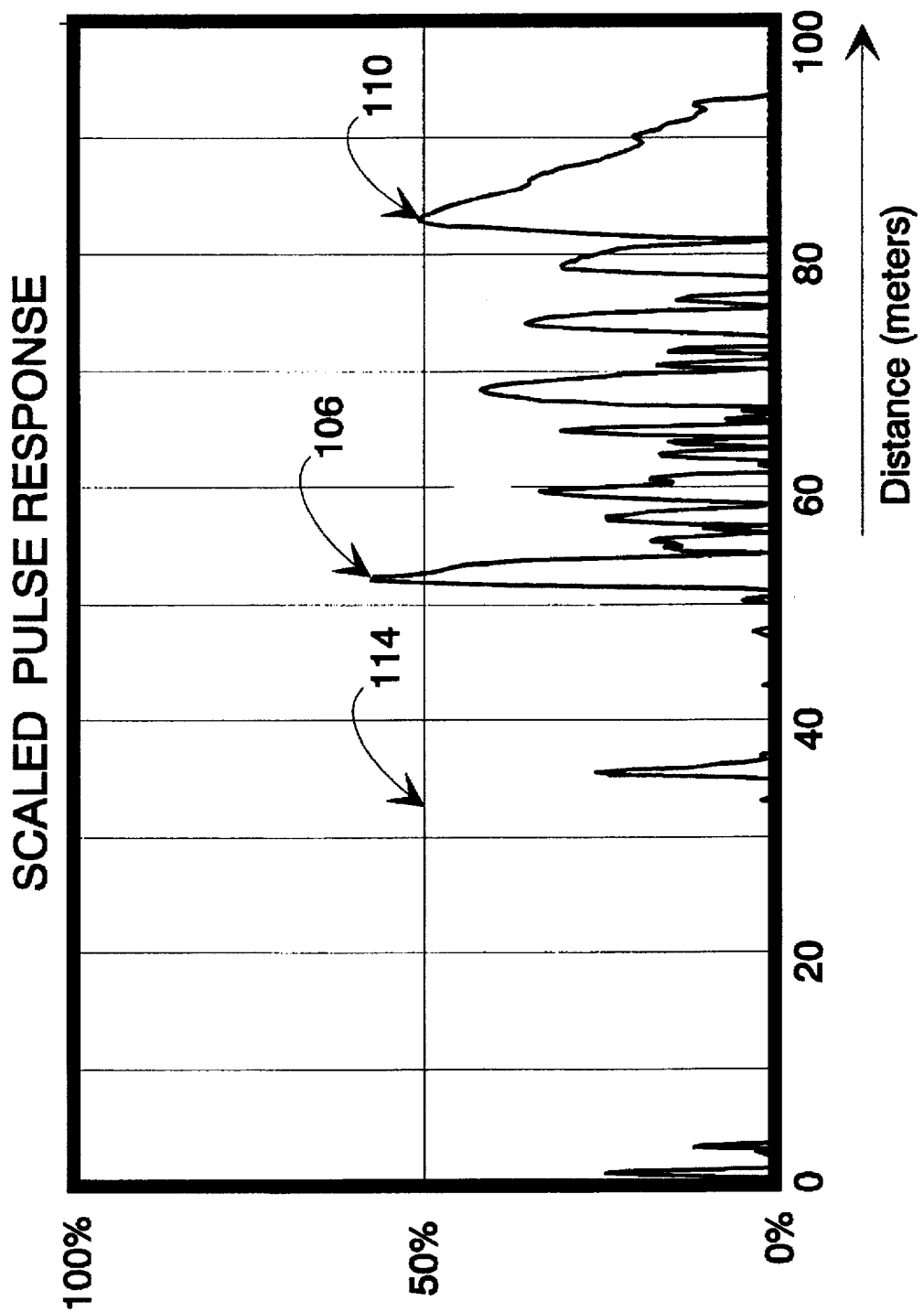
FIG. 9 is a graph illustrating the pulse response of FIG. 8 now scaled and ready to visually display sources of cross-talk according to the present invention.

In FIG. 9, there is shown the pulse response of FIG. 8 that has now been scaled according to the equation (4) below:

$$z_n = f(y_n) \quad (4)$$

where $f(y_n)$ is a scaling function, either linear or logarithmic $y_n$ is the integrated pulse response, and $z_n$ is the scaled and integrated pulse response.

A limit level 114 is plotted on the graph at a cross-talk level that is correlated to an amplitude level that would cause a failing NEXT specification. In the preferred embodiment, the limit level 114 is placed at the 50% level of the vertical scale for ease of interpretation. The integrated pulse response of FIG. 8 is scaled according to the scaling function $f(y_n)$ and visually displayed on the display 86 of the test instrument 10 according to FIG. 9 as shown.

The peak 106, which corresponds with the connector 36, has an amplitude well above the limit level 114. The peak 110 has an amplitude that is substantially equal to the limit level 114. All other peaks and areas have amplitudes that are substantially below the limit level 114. From this graph which appears graphically on the display 86 of the test instrument 10, the user can reasonably conclude that the connector 36 is the primary reason for the failure of the LAN cable system 14 to meet its NEXT specification. Furthermore, the connector 40 would cause the LAN cable system 14 to function close to the limit of the NEXT specification independently of the cross-talk contributions of other sources. The test instrument 10 that provides a scaled cross-talk display according to FIG. 9 thus allows for simplified and more rapid interpretation of measurement results for purposes of troubleshooting the LAN cable system 14.

Figure 10:
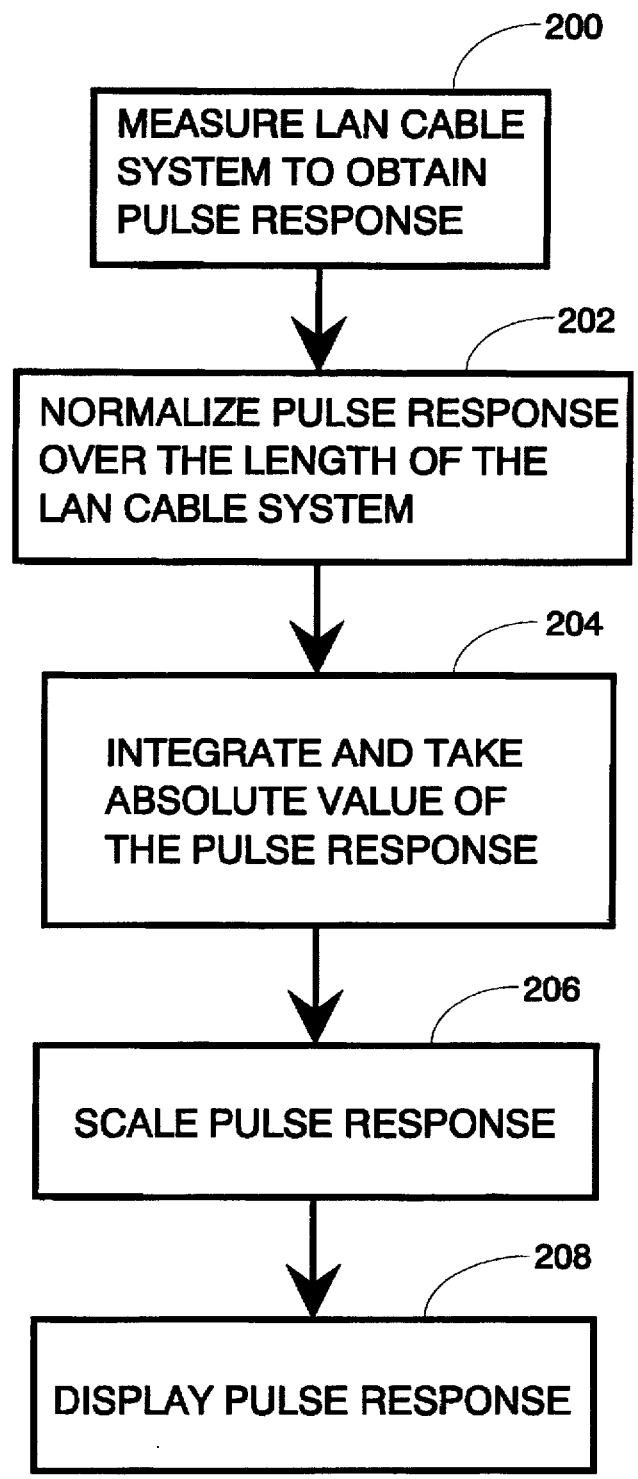
FIG. 10 is a flow diagram of the method of processing pulse response data according to the present invention to visually display sources of cross-talk in the LAN cable system.

FIG. 10 is a flow diagram of the method of processing cross-talk response information as explained above in FIG. 5 through FIG. 9.

In process 200 labeled MEASURE LAN CABLE SYSTEM TO OBTAIN PULSE RESPONSE, the test instrument 10 is coupled to the near-end of the LAN cable system 14 and a measurement is taken to obtain the NEXT pulse response between a selected pair of transmission lines. FIG. 5 is an example of a NEXT pulse response.

In process 202 labeled NORMALIZE PULSE RESPONSE OVER THE LENGTH OF THE LAN CABLE SYSTEM, the NEXT pulse response is multiplied by the compensating weight function to remove the effects of cable attenuation versus length. FIG. 7 is an example of the compensating weight function calculated according to commonly-available LAN cables. FIG. 6 is an example of a normalized pulse response.

In process 204 labeled INTEGRATE AND TAKE ABSOLUTE VALUE OF THE PULSE RESPONSE, the normalized pulse response is integrated to reduce the effects of ringing and noise. The magnitude or absolute value of the integrated pulse response is taken because the polarity of the information is not needed. FIG. 8 is an example of an integrated pulse response.

In process 206 labeled SCALE PULSE RESPONSE, the normalized pulse response is plotted on a graph containing the limit level 114 which is correlated to the pass-fail limit level of NEXT in the frequency domain. The limit level occurs at the 50% level in the preferred embodiment. The scaling function f0 depends on the level of NEXT performance being testing to, for example category 3 or category 5. The user must select the appropriate level of NEXT performance in order to get a meaningful level for the limit level 114. FIG. 9 is an example of the graph containing the limit level 114 and the scaled and normalized pulse response.

In process 208 labeled DISPLAY PULSE RESPONSE, the graphical plot containing the limit level as shown in FIG. 9 is displayed on the graphical display 86 of the instrument 10 for the user to interpret in the process of troubleshooting the LAN cable network 14.

It will be obvious to those having ordinary skill in the art that many changes may be made in the details of the above described preferred embodiments of the invention without departing from the spirit of the invention in its broader aspects. For example, the present invention may be employed to test a variety of transmission line types that would benefit from pulse-based measurements of cross-talk. The details of the graphical display actually presented to the test user may readily be optimized to improve ease of interpretation. For example, the use of color to highlight areas of the pulse response above the limit level could readily be employed by one skilled in the art. Furthermore, the method of processing pulse response information is not limited to cross-talk responses but may be readily adapted for any type of pulse response testing that requires interpretation of the pulse response which has noise, amplitude distortion, and ringing minimized and also must be scaled to allow a quick visual reference to a limit level. Therefore, the scope of the present invention should be determined by the following claims.

What I claim as my invention is:

1. In a test instrument for measuring cross-talk in a LAN cable system, a method for processing a cross-talk pulse response for quickly locating sources of said cross-talk, comprising:

(a) measuring said LAN cable system to obtain said cross-talk pulse response;

(b) normalizing said cross-talk pulse response over the length of said LAN cable system wherein said cross-talk pulse response is multiplied by a compensating weight function to obtain a normalized pulse response;

(c) integrating said normalized pulse response over its length to obtain an integrated pulse response;

(d) calculating the absolute value of said integrated pulse response;

(e) scaling said integrated pulse response to obtain a scaled pulse response that corresponds to a graph of amplitude versus distance along said LAN cable system; and (f) displaying said scaled pulse response plotted on said graph.

2. A method for processing a cross-talk pulse response for quickly locating sources of said cross-talk according to claim 1 further comprising scaling said integrated pulse response according to a scaling function comprising one of a linear scaling function and a logarithmic scaling function.

3. A method for processing a cross-talk pulse response for quickly locating sources of said cross-talk according to claim 1 wherein said graph contains a limit level correlated to the NEXT response of said LAN cable system at a predetermined specification limit.

4. A method for processing a cross-talk pulse response for quickly locating sources of said cross-talk according to claim 3 wherein said limit level is placed at a fifty percent level on said graph.

5. A method for processing a cross-talk pulse response for quickly locating sources of said cross-talk according to claim 1 further comprising calculating said compensating weight function to remove effects of attenuation over the length of said LAN cable system.

6. A method for processing a cross-talk pulse response for quickly locating sources of said cross-talk according to claim 5 wherein said compensating weight function is a best fit line calculated according to a polynomial equation.

7. A method for processing a cross-talk pulse response for quickly locating sources of said cross-talk according to claim 1 wherein said graph is displayed on a graphical display of said test instrument and said graphical display is viewable by a test instrument user.

8. In a test instrument for measuring cross-talk in a LAN cable system, a method for processing a cross-talk pulse response for quickly locating sources of said cross-talk, comprising:

(a) measuring said LAN cable system to obtain said cross-talk pulse response;

(b) normalizing said cross-talk pulse response over the length of said LAN cable system wherein said cross-talk pulse response is multiplied by a compensating weight function to obtain a normalized pulse response;

(c) integrating said normalized pulse response over its length to obtain an integrated pulse response;

(d) calculating the absolute value of said integrated pulse response;

(e) scaling said integrated pulse response to obtain a scaled pulse response that corresponds to a graph of amplitude versus distance along said LAN cable system; and (f) displaying said scaled pulse response plotted on said graph wherein said graph contains a limit level correlated to the NEXT response of said LAN cable system at a predetermined specification limit.

9. A method for processing a cross-talk pulse response for quickly locating sources of said cross-talk according to claim 8 further comprising scaling said integrated pulse response according to a scaling function comprising one of a linear scaling function and a logarithmic scaling function.

10. A method for processing a cross-talk pulse response for quickly locating sources of said cross-talk according to claim 8 wherein said limit level is placed at a fifty percent level on said graph.

11. A method for processing a cross-talk pulse response for quickly locating sources of said cross-talk according to claim 8 further comprising calculating said compensating weight function to remove effects of attenuation over the length of said LAN cable system.

12. A method for processing a cross-talk pulse response for quickly locating sources of said cross-talk according to claim 11 wherein said compensating weight function is a best fit line calculated according to a polynomial equation.

* * * * *